US012248177B2

(12) United States Patent
Bian

(10) Patent No.: US 12,248,177 B2
(45) Date of Patent: Mar. 11, 2025

(54) WAVEGUIDE CROSSINGS WITH A MULTIPLE-LEVEL NON-CONTACTING ARRANGEMENT

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 207 days.

(21) Appl. No.: 17/869,858

(22) Filed: Jul. 21, 2022

(65) Prior Publication Data

US 2024/0027685 A1    Jan. 25, 2024

(51) Int. Cl.
*G02B 6/125* (2006.01)
*G02B 6/136* (2006.01)
*G02B 6/12* (2006.01)

(52) U.S. Cl.
CPC ............ *G02B 6/125* (2013.01); *G02B 6/136* (2013.01); *G02B 2006/12119* (2013.01)

(58) Field of Classification Search
CPC ...................................................... G02B 6/125
See application file for complete search history.

(56) References Cited

U.S. PATENT DOCUMENTS

| | | | |
|---|---|---|---|
| 6,411,765 B1 | 6/2002 | Ono | |
| 9,784,914 B2 * | 10/2017 | Jiang | G02B 6/2938 |
| 10,649,140 B1 | 5/2020 | Bian et al. | |
| 10,718,903 B1 * | 7/2020 | Bian | G02B 6/125 |
| 10,816,725 B2 | 10/2020 | Bian et al. | |
| 10,989,873 B1 | 4/2021 | Jacob et al. | |
| 2015/0247974 A1 | 9/2015 | Painchaud et al. | |
| 2017/0254951 A1 | 9/2017 | Dumais et al. | |
| 2021/0294035 A1 | 9/2021 | Bian et al. | |
| 2022/0146748 A1 | 5/2022 | Bian | |

FOREIGN PATENT DOCUMENTS

CN        104865639 A  *  8/2015    ......... G02B 6/12007

OTHER PUBLICATIONS

Translation of CN104865639A (Year: 2015).*

(Continued)

*Primary Examiner* — Chad H Smith
(74) *Attorney, Agent, or Firm* — Thompson Hine LLP; Anthony Canale

(57) ABSTRACT

Structures for a waveguide crossing and methods of fabricating a structure for a waveguide crossing. The structure comprises a first waveguide core and a second waveguide core each including a first section, a second section, and a first waveguide bend connecting the first section to the second section. The second section terminates the first waveguide core. The second section terminates the second waveguide core. The second waveguide bend has a side surface that is spaced from a side surface of the first waveguide bend by a gap. A third waveguide core is terminated by a section having an overlapping arrangement with the second section of the first waveguide core. A fourth waveguide core is terminated by a section having an overlapping arrangement with the second section of the second waveguide core.

20 Claims, 12 Drawing Sheets

(56) References Cited

OTHER PUBLICATIONS

Ryotaro Konoike et al., "SiN/Si double-layer platform for ultralow-crosstalk multiport optical switches," Optics Express 27, 21130-21141 (2019).

Kuanping Shang et al., "Low-loss compact multilayer silicon nitride platform for 3D photonic integrated circuits," Optics Express 23, 21334-21342 (2015).

W. D. Sacher et al., "Monolithically Integrated Multilayer Silicon Nitride on-Silicon Waveguide Platforms for 3-D Photonic Circuits and Devices," in Proceedings of the IEEE, vol. 106, No. 12, pp. 2232-2245, Dec. 2018, doi: 10.1109/JPROC.2018.2860994.

Adam M. Jones et al., "Ultra-low crosstalk, CMOS compatible waveguide crossings for densely integrated photonic Interconnection networks," Optics Express 21, 12002-12013 (2013).

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

European Patent Office, Extended European Search Report and Opinion issued in European Patent Application No. 23180505.2 on Jan. 2, 2024; 8 pages.

* cited by examiner

WAVEGUIDE CROSSINGS WITH A MULTIPLE-LEVEL NON-CONTACTING ARRANGEMENT

BACKGROUND

The disclosure relates to photonics chips and, more specifically, to structures for a waveguide crossing and methods of fabricating a structure for a waveguide crossing.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

A waveguide crossing is a building block used in photonics chips to provide paths for propagating light. Waveguide cores may be arranged in multiple levels on a photonics chip. For example, a waveguide core may be formed in a lower level by patterning a layer of material, and a waveguide core may be formed in an upper level by patterning another layer of material. In the layout of the photonics chip, the waveguide core in the upper level may be routed over and across the waveguide core in the lower level. Such waveguide crossings may result in significant insertion loss and high cross-talk due to strong light scattering induced by the close local proximity of the waveguide cores in the different levels.

Improved structures for a waveguide crossing and methods of fabricating a structure for a waveguide crossing are needed.

SUMMARY

In an embodiment of the invention, a structure for a waveguide crossing is provided. The structure comprises a first waveguide core including a first section, a second section, and a first waveguide bend connecting the first section to the second section. The second section terminates the first waveguide core, and the first waveguide core has a first side surface extending about the first waveguide bend. The structure further comprises a second waveguide core including a first section, a second section, and a second waveguide bend connecting the first section to the second section. The second section terminates the second waveguide core, the second waveguide core has a second side surface extending about the second waveguide bend, and the second waveguide bend is spaced from the first waveguide bend by a gap between the second side surface and the first side surface. The structure further comprises a third waveguide core including a section terminating the third waveguide core and a fourth waveguide core including a section terminating the fourth waveguide core. The section of the third waveguide core and the second section of the first waveguide core have a first overlapping arrangement, and the section of the fourth waveguide core and the second section of the second waveguide core have a second overlapping arrangement.

In an embodiment of the invention, a structure for a waveguide crossing is provided. The structure comprises a first waveguide core including a first waveguide bend, and a second waveguide core including a second waveguide bend. The first waveguide core has a first side surface extending about the first waveguide bend, the second waveguide core has a second side surface extending about the second waveguide bend, and the second waveguide bend is spaced from the first waveguide bend by a gap between the second side surface and the first side surface. The structure further comprises a third waveguide core including a section terminating the third waveguide core and a fourth waveguide core including a section terminating the fourth waveguide core. The section of the third waveguide core and the first waveguide bend of the first waveguide core have a first overlapping arrangement, and the section of the fourth waveguide core and the second waveguide bend of the second waveguide core have a second overlapping arrangement.

In an embodiment of the invention, a method of forming a structure for a waveguide crossing is provided. The method comprises forming a first waveguide core including a first section, a second section, and a first waveguide bend connecting the first section to the second section. The second section terminates the first waveguide core, and the first waveguide core has a first side surface extending about the first waveguide bend. The method further comprises forming a second waveguide core including a first section, a second section, and a second waveguide bend connecting the first section to the second section. The second section terminates the second waveguide core, the second waveguide core has a second side surface extending about the second waveguide bend, and the second waveguide bend is spaced from the first waveguide bend by a gap between the second side surface and the first side surface. The method further comprises forming a third waveguide core including a section terminating the third waveguide core, and forming a fourth waveguide core including a section terminating the fourth waveguide core. The section of the third waveguide core and the second section of the first waveguide core have a first overlapping arrangement, and the section of the fourth waveguide core and the second section of the second waveguide core have a second overlapping arrangement.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
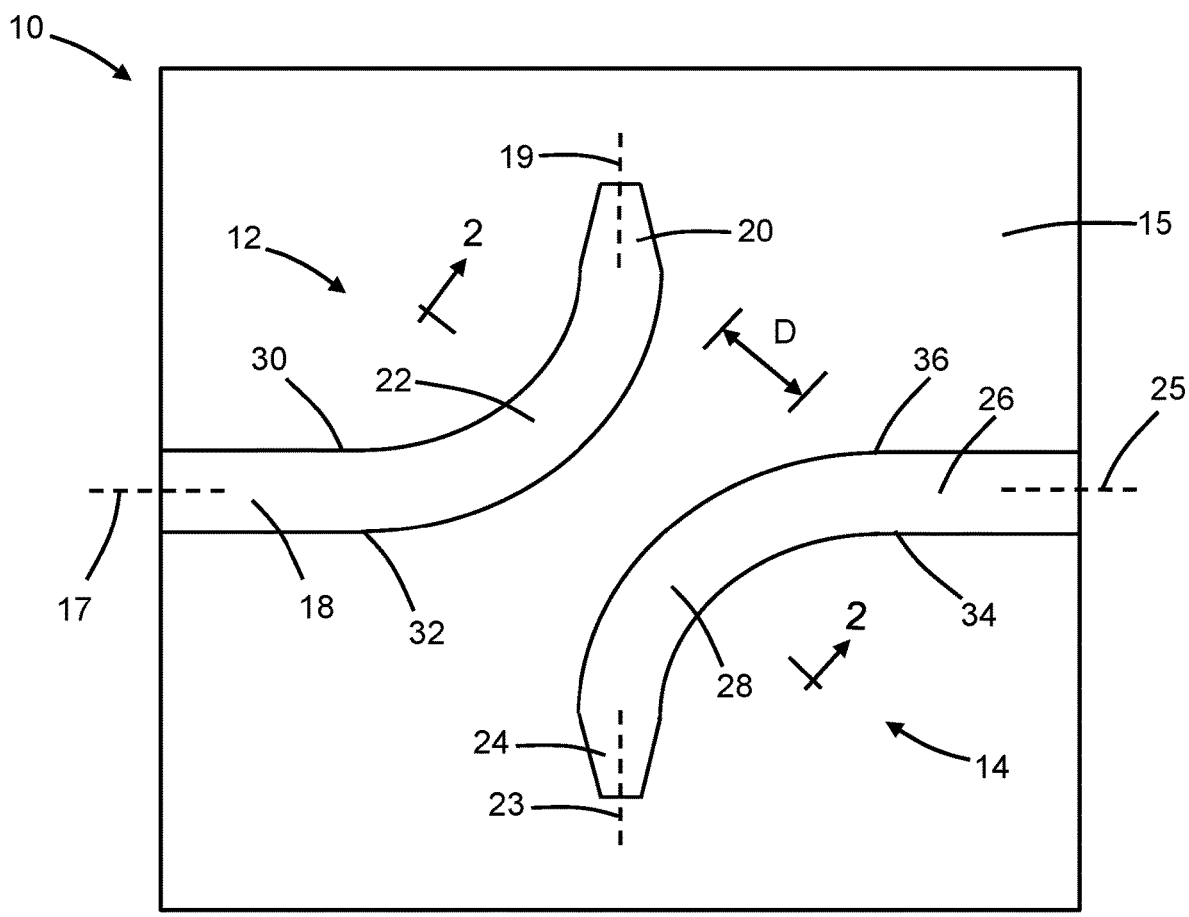
FIG. 1 is a top view of a structure at an initial fabrication stage of a processing method in accordance with embodiments of the invention.
Figure 2:
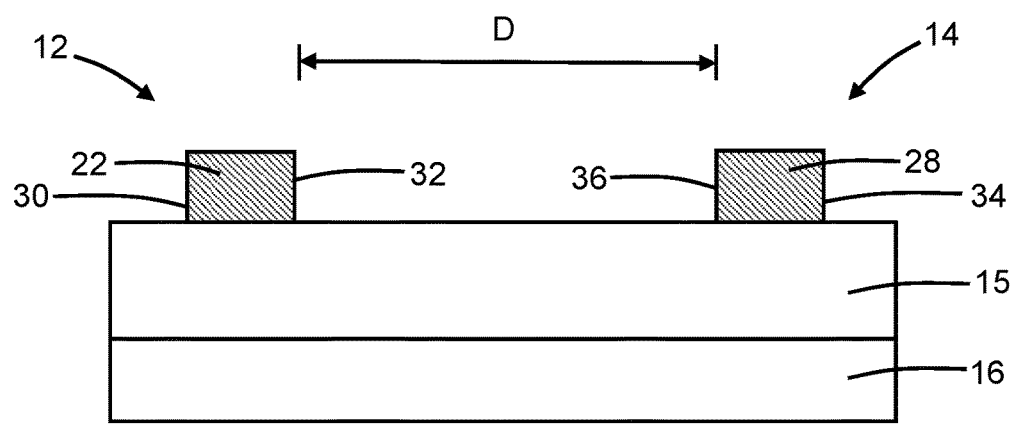
FIG. 2 is a cross-sectional view taken generally along line 2-2 in FIG. 1.

With reference to FIGS. 1, 2 and in accordance with embodiments of the invention, a structure 10 for a non-contact waveguide crossing includes a waveguide core 12 and a waveguide core 14 that are positioned over a dielectric layer 15 and a substrate 16. In an embodiment, the dielectric layer 15 may be comprised of a dielectric material, such as silicon dioxide, and the substrate 16 may be comprised of a semiconductor material, such as single-crystal silicon. In an embodiment, the dielectric layer 15 may be a buried oxide layer of a silicon-on-insulator substrate, and the dielectric layer 15 may separate the waveguide cores 12, 14 from the substrate 16. In an alternative embodiment, one or more additional dielectric layers comprised of, for example, silicon dioxide may separate the waveguide cores 12, 14 from the dielectric layer 15. In an alternative embodiment, the substrate 16 may include an undercut or cavity beneath the waveguide cores 12, 14.

In an embodiment, the waveguide cores 12, 14 may be comprised of a material having a refractive index that is greater than the refractive index of silicon dioxide. In an embodiment, the waveguide cores 12, 14 may be comprised of a semiconductor material, such as single-crystal silicon. In an alternative embodiment, the waveguide cores 12, 14 may be comprised of a dielectric material, such as silicon nitride, silicon oxynitride, or aluminum oxide. In alternative embodiments, other materials, such as a polymer or a III-V compound semiconductor, may be used to form the waveguide cores 12, 14.

In an embodiment, the waveguide cores 12, 14 may be formed by patterning a layer of material with lithography and etching processes. In an embodiment, the waveguide cores 12, 14 may be formed by patterning the semiconductor material (e.g., single-crystal silicon) of a device layer of a silicon-on-insulator substrate. In an embodiment, the waveguide cores 12, 14 may be formed by patterning a deposited layer of a material (e.g., silicon nitride). In an alternative embodiment, a slab layer may be connected to a lower portion of the waveguide cores 12, 14. The slab layer may be formed when the waveguide cores 12, 14 are patterned, and the slab layer, which is positioned on the dielectric layer 15, has a thickness that is less than the thickness of the waveguide cores 12, 14.

The waveguide core 12 has a section 18 that extends along a longitudinal axis 17, section 20 that extends along a longitudinal axis 19, and a waveguide bend 22 extending along a curved centerline and effectively providing a curved section connecting the section 18 with the section 20. The longitudinal axis 17 of the section 18 of the waveguide core 12 is angled or inclined at an angle relative to the longitudinal axis 19 of the section 20 of the waveguide core 12 due to a change in direction provided by the waveguide bend 22. The section 20 of the waveguide core 12 includes an end that terminates the waveguide core 12. In an embodiment, the section 20 of the waveguide core 12 may be tapered with a width dimension that decreases with decreasing distance from the terminating end.

The waveguide core 14 has a section 24 that extends along a longitudinal axis 23, section 26 that extends along a longitudinal axis 25, and a waveguide bend 28 extending along a curved centerline and effectively providing a curved section connecting the section 24 with the section 26. The longitudinal axis 23 of the section 24 of the waveguide core 14 is angled or inclined at an angle relative to the longitudinal axis 25 of the section 26 of the waveguide core 14 due to a change in direction provided by the waveguide bend 28. The section 26 of the waveguide core 14 includes an end that terminates the waveguide core 14. In an embodiment, the section 26 of the waveguide core 14 may be tapered with a width dimension that decreases with decreasing distance from the terminating end.

The waveguide core 12 includes sidewalls in the form of opposite side surfaces 30, 32. The side surfaces 30, 32 may be straight over the sections 18, 20 of the waveguide core 12, and the side surfaces 30, 32 may be curved over the waveguide bend 22 of the waveguide core 12. The side surface 30 of the waveguide core 12 is arranged at the inner radius of the waveguide bend 22, and the side surface 32 of the waveguide core 12 is arranged at the outer radius of the waveguide bend 22.

The waveguide core 14 includes sidewalls in the form of opposite side surfaces 34, 36. The side surfaces 34, 36 may be straight over the sections 24, 26 of the waveguide core 14, and the side surfaces 34, 36 may be curved over the waveguide bend 28 of the waveguide core 14. The side surface 34 is arranged at the inner radius of the waveguide bend 28, and the side surface 36 is arranged at the outer radius of the waveguide bend 28.

The longitudinal axis 17 of the section 18 of the waveguide core 12 may be aligned either collinear or substantially collinear with the longitudinal axis 25 of the section 26 of the waveguide core 14. Similarly, the longitudinal axis 19 of the section 20 of the waveguide core 12 may be aligned collinear or substantially collinear with the longitudinal axis 23 of the section 24 of the waveguide core 14. In an embodiment, the waveguide bend 22 may be curved to provide a 90° change in direction such that the longitudinal axes 17, 19 are perpendicular. In an embodiment, the waveguide bend 28 may be curved to provide a 90° change in direction such that the longitudinal axes 23, 25 are perpendicular. However, a non-right angle curvature may be chosen for one or both of the waveguide bends 22, 28 to provide a change of direction characterized by a different angular inclination.

The shape of the waveguide bends 22, 28 may be characteristic of a sector of an annulus in which the inner and outer radii of each waveguide bend 22, 28 are shaped as arcs having a constant curvature. In alternative embodiments, the waveguide bends 22, 28 may be shaped according to another type of curve, such as a curve with a complex curvature that is described by an equation or formula such as a sine function, a cosine function, a spline function, an Euler spiral function, etc., that provides an adiabatic bend. In an embodiment, the curvatures of the inner and outer radii of the waveguide bend 22 may be respectively equal to the curvatures of the inner and outer radii of the waveguide bend 28. In an alternative embodiment, the waveguide bend 22 may have a curvature that is not equal to the curvature of the waveguide bend 28.

The waveguide bend 22 is arranged along the length of the waveguide core 12 adjacent to the waveguide bend 28 of the waveguide core 14 to define a coupling region. The waveguide bend 22 is convex at the outer side surface 32, and the waveguide bend 28 is convex at the outer side surface 36. The gap between the side surface 32 at the outer radius of the waveguide bend 22 and the side surface 36 at the outer radius of the waveguide bend 28 is provided with a gap distance D that is selected to promote light transfer. The gap distance D may be wavelength dependent and represents a distance of minimum separation for the side surfaces 32, 36. The gap distance D may be a perpendicular distance from the side surface 32 at the outer radius of the waveguide bend 22 to the side surface 36 at the outer radius of the waveguide bend 28 measured along a line that is perpendicular to both of the side surfaces 32, 36. In an embodiment, the gap distance D may range, in terms of wavelength ($\lambda$) of the transferred light, from $0.03*\lambda$ to $2*\lambda$.

Light may be transferred between the waveguide cores 12, 14 by light coupling between the waveguide bends 22, 28 within the coupling region. For example, light propagating in the waveguide core 12 may be transferred from the waveguide bend 22 of the waveguide core 12 to the waveguide bend 28 of the waveguide core 14. The light transfer is enabled although the waveguide cores 12, 14 do not physically cross and are non-contacting.

Figure 3:
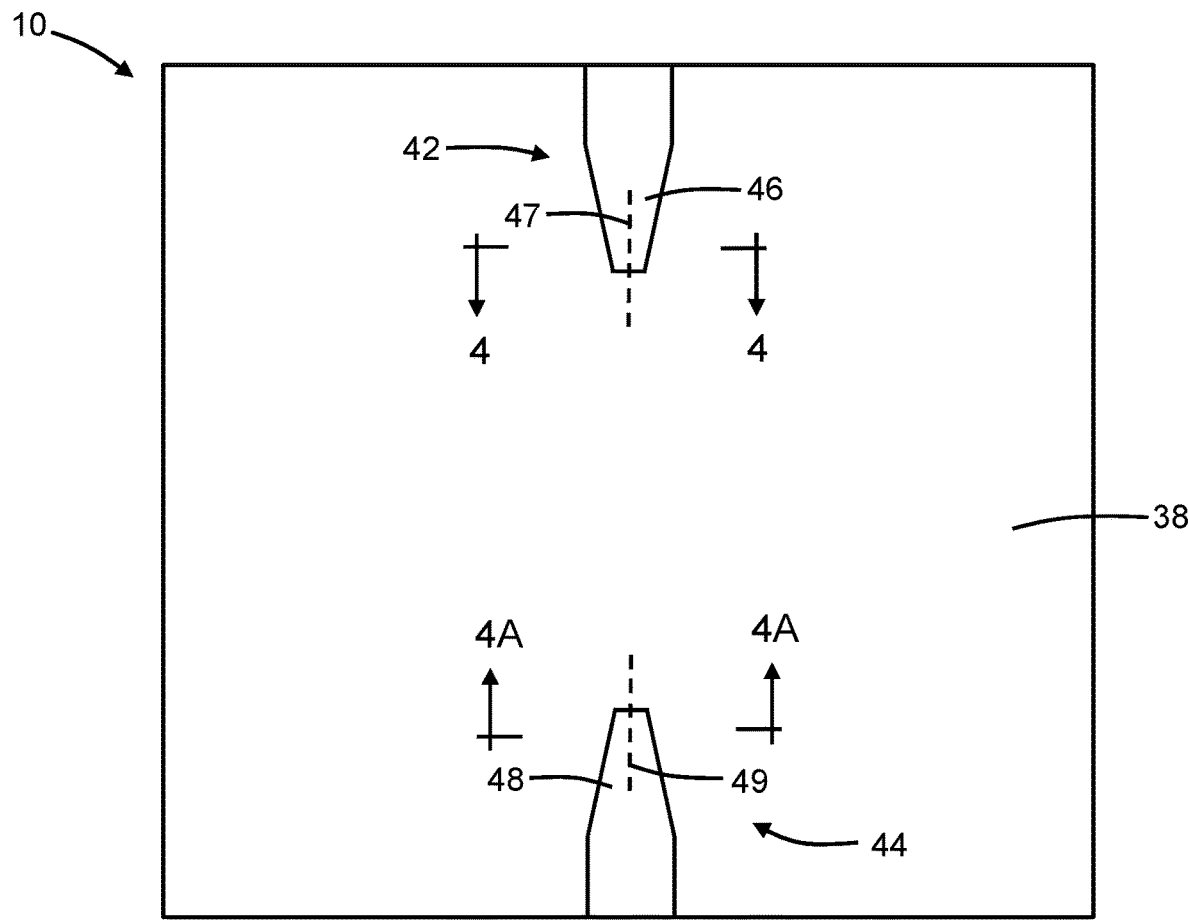
FIG. 3 is a top view of the structure at a fabrication stage of the processing method subsequent to FIG. 1.
Figure 4:
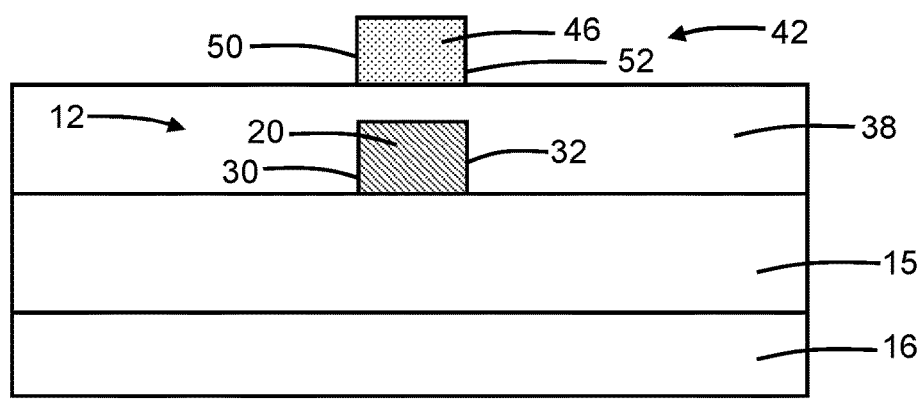
FIG. 4 is a cross-sectional view taken generally along line 4-4 in FIG. 3.
Figure 4A:
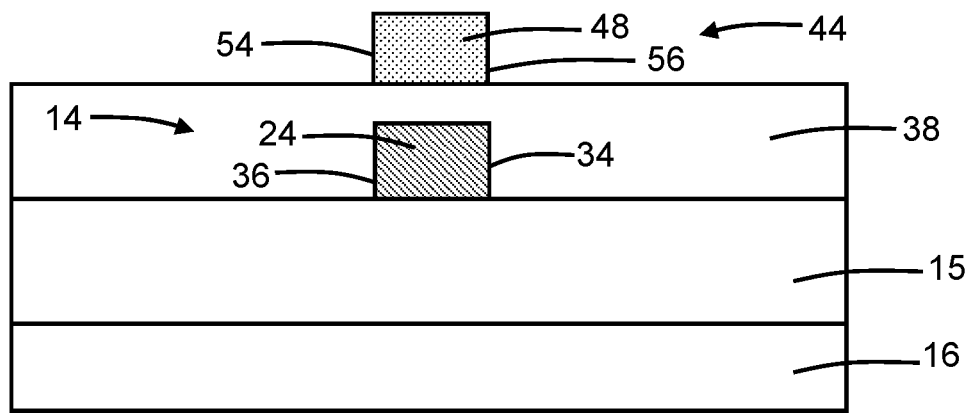
FIG. 4A is a cross-sectional view taken generally along line 4A-4A in FIG. 3.

With reference to FIGS. 3, 4, 4A in which like reference numerals refer to like features in FIGS. 1, 2 and at a subsequent fabrication stage, a dielectric layer 38 is formed over the waveguide cores 12, 14. The dielectric layer 38 may be comprised of a dielectric material, such as silicon dioxide, that is deposited and then planarized. In an embodiment, the waveguide cores 12, 14 may be embedded in the dielectric layer 38, which may be thicker than the waveguide cores 12, 14. The dielectric material constituting the dielectric layer 38 may have a refractive index that is less than the refractive index of the material constituting the waveguide cores 12, 14.

A waveguide core 42 and a waveguide core 44 are positioned over the dielectric layer 38. In an embodiment, the waveguide cores 42, 44 may be comprised of a material having a refractive index that is greater than the refractive index of silicon dioxide. In an embodiment, the waveguide cores 42, 44 may be comprised of a dielectric material, such as silicon nitride, silicon oxynitride, or aluminum oxide. In an alternative embodiment, the waveguide cores 42, 44 may be comprised of a semiconductor material, such as polysilicon. In alternative embodiments, other materials, such as a polymer or a III-V compound semiconductor, may be used to form the waveguide cores 42, 44.

In an embodiment, the waveguide cores 42, 44 may be formed by patterning a layer of material with lithography and etching processes. In an embodiment, the waveguide cores 42, 44 may be formed by patterning a deposited layer of a material (e.g., silicon nitride). In an alternative embodiment, a slab layer may be connected to a lower portion of the waveguide cores 42, 44. The slab layer may be formed when the waveguide cores 42, 44 are patterned, and the slab layer, which is positioned on the dielectric layer 38, has a thickness that is less than the thickness of the waveguide cores 42, 44.

The waveguide core 42 has a section 46 that extends along a longitudinal axis 47. The section 46 of the waveguide core 42 includes an end that terminates the waveguide core 42. The waveguide core 42 includes sidewalls in the form of opposite side surfaces 50, 52. In an embodiment, the section 46 of the waveguide core 42 may be tapered with a width dimension between the side surfaces 50, 52 that decreases with decreasing distance from the terminating end. The section 46 of the waveguide core 42 is positioned in an overlapping arrangement with the section 20 of the waveguide core 12.

The waveguide core 44 has a section 48 that extends along a longitudinal axis 49. The longitudinal axis 49 of the section 48 of the waveguide core 44 may be aligned either collinear or substantially collinear with the longitudinal axis 47 of the section 46 of the waveguide core 42. The section 48 of the waveguide core 44 includes an end that terminates the waveguide core 44. The waveguide core 44 includes sidewalls in the form of opposite side surfaces 54, 56. In an embodiment, the section 48 of the waveguide core 44 may be tapered with a width dimension between the side surfaces 54, 56 that decreases with decreasing distance from the terminating end. The section 48 of the waveguide core 44 is positioned in an overlapping arrangement with the section 24 of the waveguide core 14.

Light may be transferred between the waveguide core 42 and the waveguide core 44 by light coupling between the overlapped sections 20, 46, light coupling between the waveguide bends 22, 28 within the coupling region, and light coupling between the overlapped sections 24, 48. For example, light propagating in the waveguide core 42 may be transferred from the section 46 to the section 20 of the waveguide core 12, from the waveguide bend 22 of the waveguide core 12 to the waveguide bend 28 of the waveguide core 14 within the coupling region, and from the section 24 of the waveguide core 14 to the section 48 of the waveguide core 44.

Figure 5:
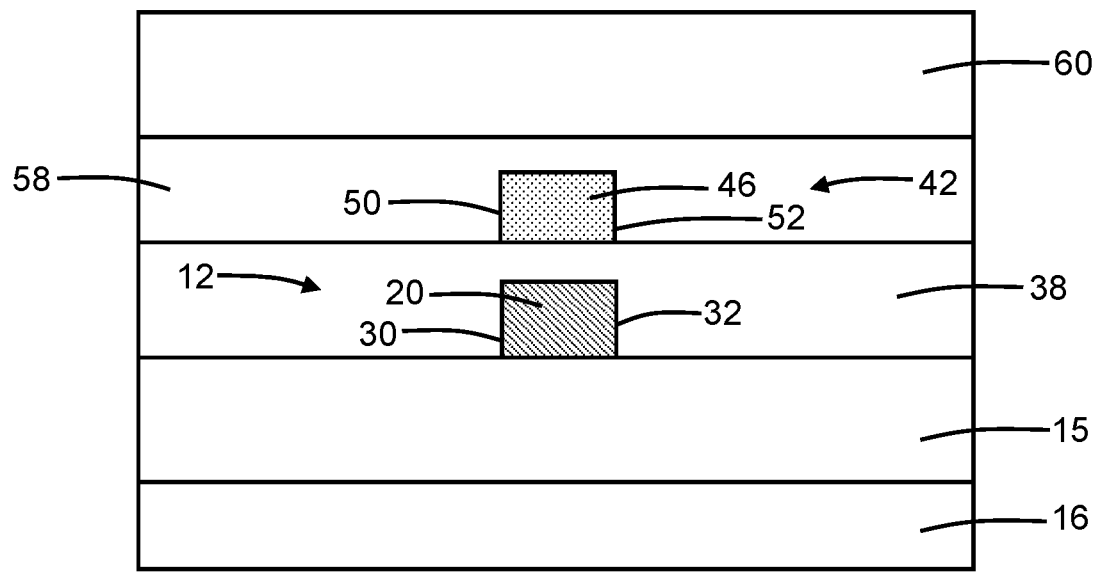
FIGS. 5, 5A are cross-sectional views of the structure at a fabrication stage of the processing method subsequent to FIGS. 4, 4A.
Figure 5A:
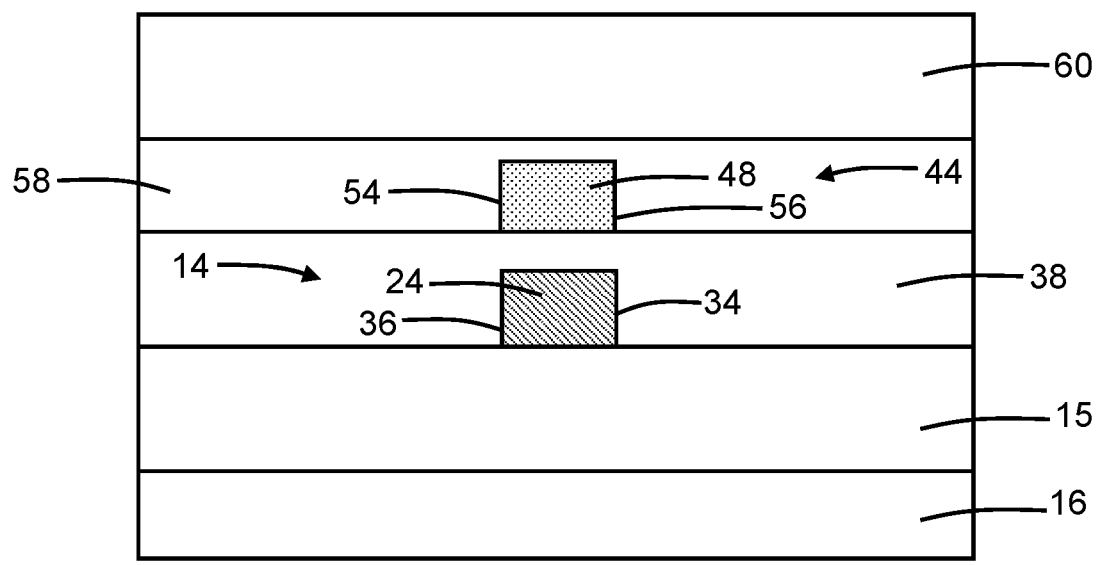

With reference to FIGS. 5, 5A in which like reference numerals refer to like features in FIGS. 4, 4A and at a subsequent fabrication stage, a dielectric layer 58 is formed over the waveguide cores 42, 44. The dielectric layer 58 may be comprised of a dielectric material, such as silicon dioxide, that is deposited and then planarized. In an embodiment, the waveguide cores 42, 44 may be embedded in the dielectric layer 58, which may be thicker than the waveguide cores 42, 44. The dielectric material constituting the dielectric layer 58 may have a refractive index that is less than the refractive index of the material constituting the waveguide cores 42, 44.

A back-end-of-line stack 60 may be formed over the dielectric layer 58. The back-end-of-line stack 60 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide.

The waveguide cores 12, 14 define the light path for one arm of the waveguide crossing, and the waveguide cores 42, 44 define the light path for the other arm of the waveguide crossing. The waveguide bends 22, 28 effectively function as part of a non-contact waveguide crossing for the arm including the waveguide cores 12, 14. The waveguide bends 22, 28, overlapped sections 20, 46, and overlapped sections 24, 48 effectively function as part of a non-contact waveguide crossing for the arm including the waveguide cores 42, 44. The non-contact waveguide crossing may be characterized by a decrease in insertion loss, in comparison with conventional waveguide crossings, without an increase in crosstalk.

Figure 6:
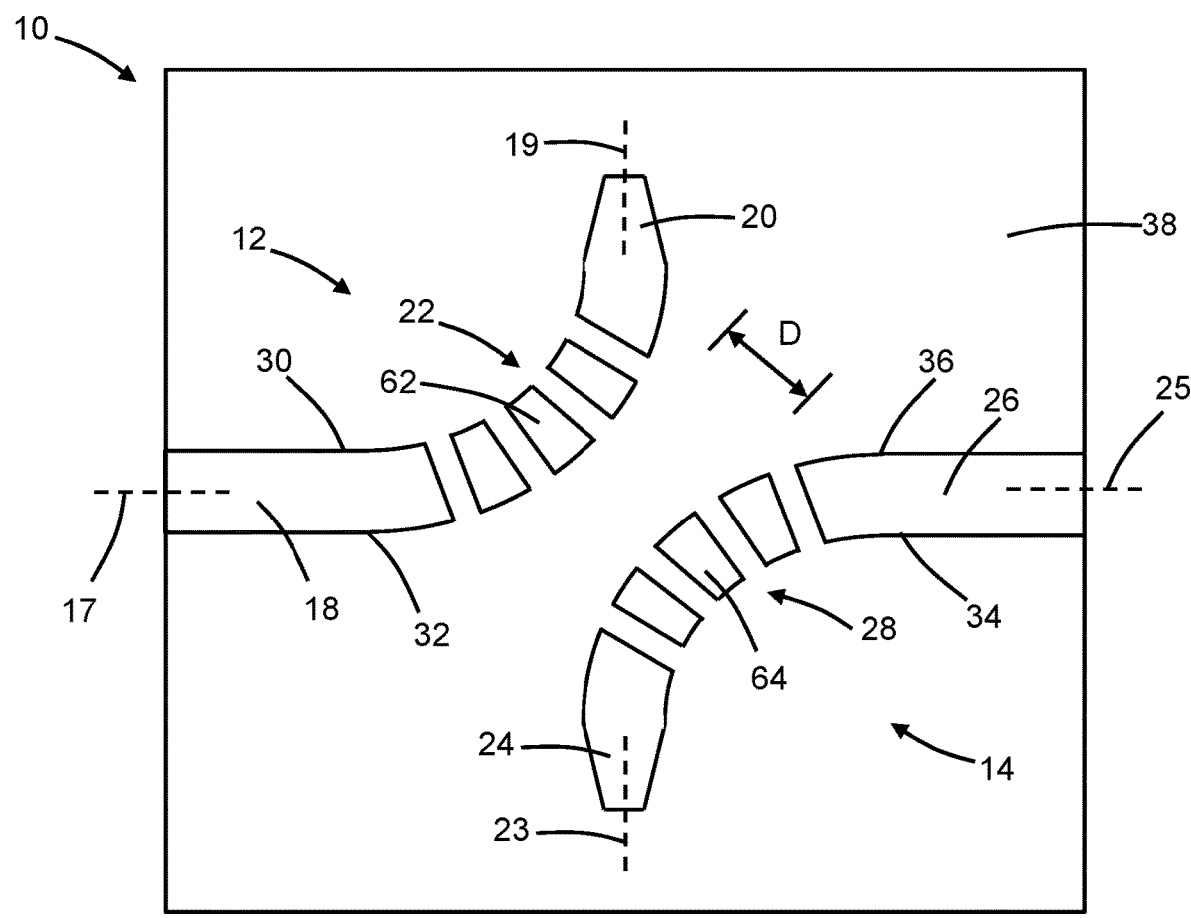
FIG. 6 is a top view of a structure in accordance with alternative embodiments of the invention.

With reference to FIG. 6 and in accordance with alternative embodiments, the waveguide bend 22 may be patterned during the lithography and etching processes forming the waveguide core 12 to provide a plurality of segments 62 separated by gaps or spaces extending fully from the side surface 30 to the side surface 32. Similarly, the waveguide bend 28 may be patterned during the lithography and etching processes forming the waveguide core 14 to provide a plurality of segments 64 separated by gaps or spaces extending fully from the side surface 34 to the side surface 36. The waveguide core 12 is discontinuous over the segmented waveguide bend 22, and the waveguide core 14 is also discontinuous over the segmented waveguide bend 28. The dielectric material of the dielectric layer 38 is located in the spaces between the segments 62 of the waveguide bend 22 and in the spaces between the segments 64 of the waveguide bend 28.

In an embodiment, the pitch and duty cycle of the segments 62 and/or the segments 64 may be uniform to define a periodic arrangement. In alternative embodiments, the pitch and/or the duty cycle of the segments 62 and/or the segments 64 may be apodized (i.e., non-uniform) to define a non-periodic arrangement. In an embodiment, the segments 62 and the segments 64 may have equal pitches and equal duty factors. The segments 62 and the segments 64 may be dimensioned and positioned at small enough pitch so as to define a sub-wavelength grating structure that does not radiate or reflect light at a wavelength of operation, such as a wavelength in a range of 400 nm to 3000 nm.

Figure 7:
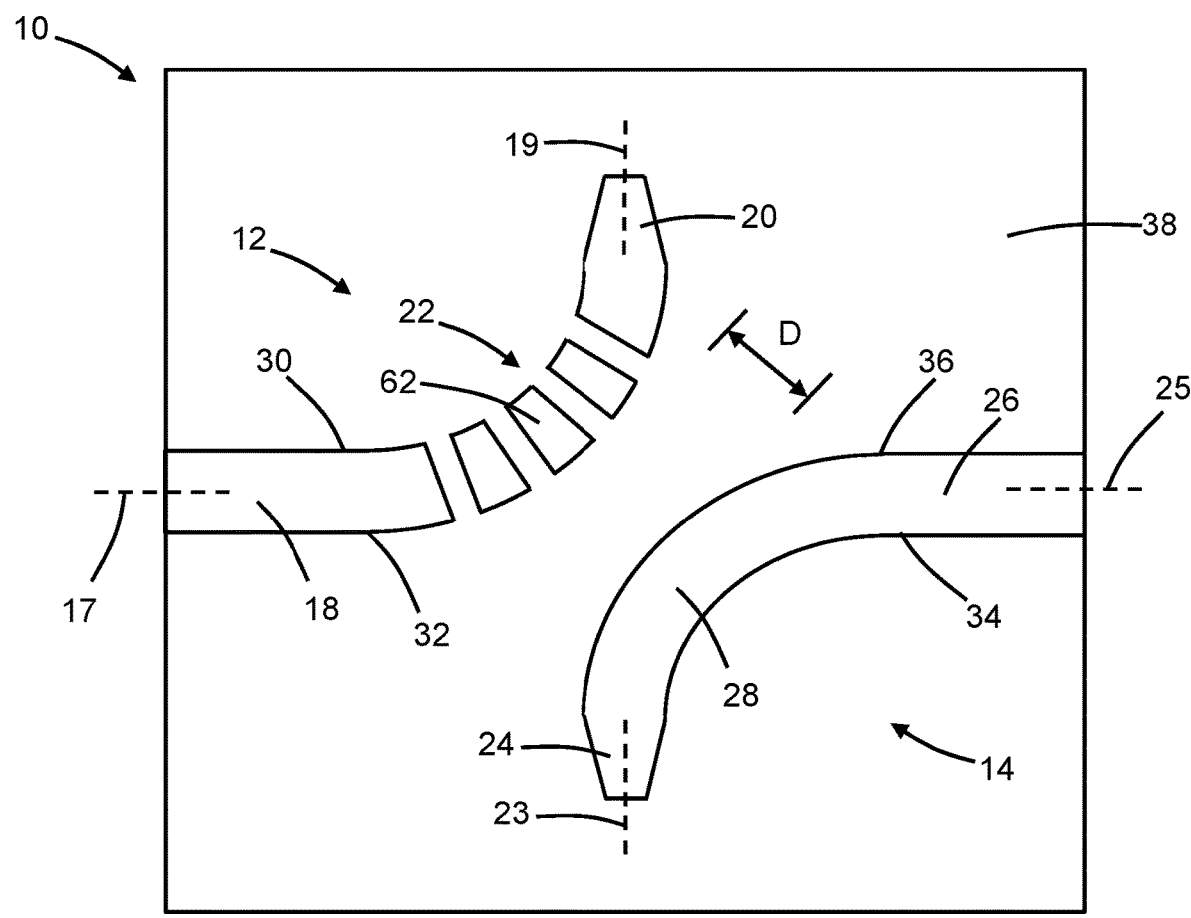
FIG. 7 is a top view of a structure in accordance with alternative embodiments of the invention.

With reference to FIG. 7 and in accordance with alternative embodiments, the waveguide bend 22 may include the segments 62 and the waveguide bend 28 may be continuous and therefore lack the segments 64 to provide a composite structure 10 in which the waveguide bend 22 is segmented and the waveguide bend 28 is non-segmented. This combination provides a composite structure in which the waveguide bends 22, 28 are structurally different.

Figure 8:
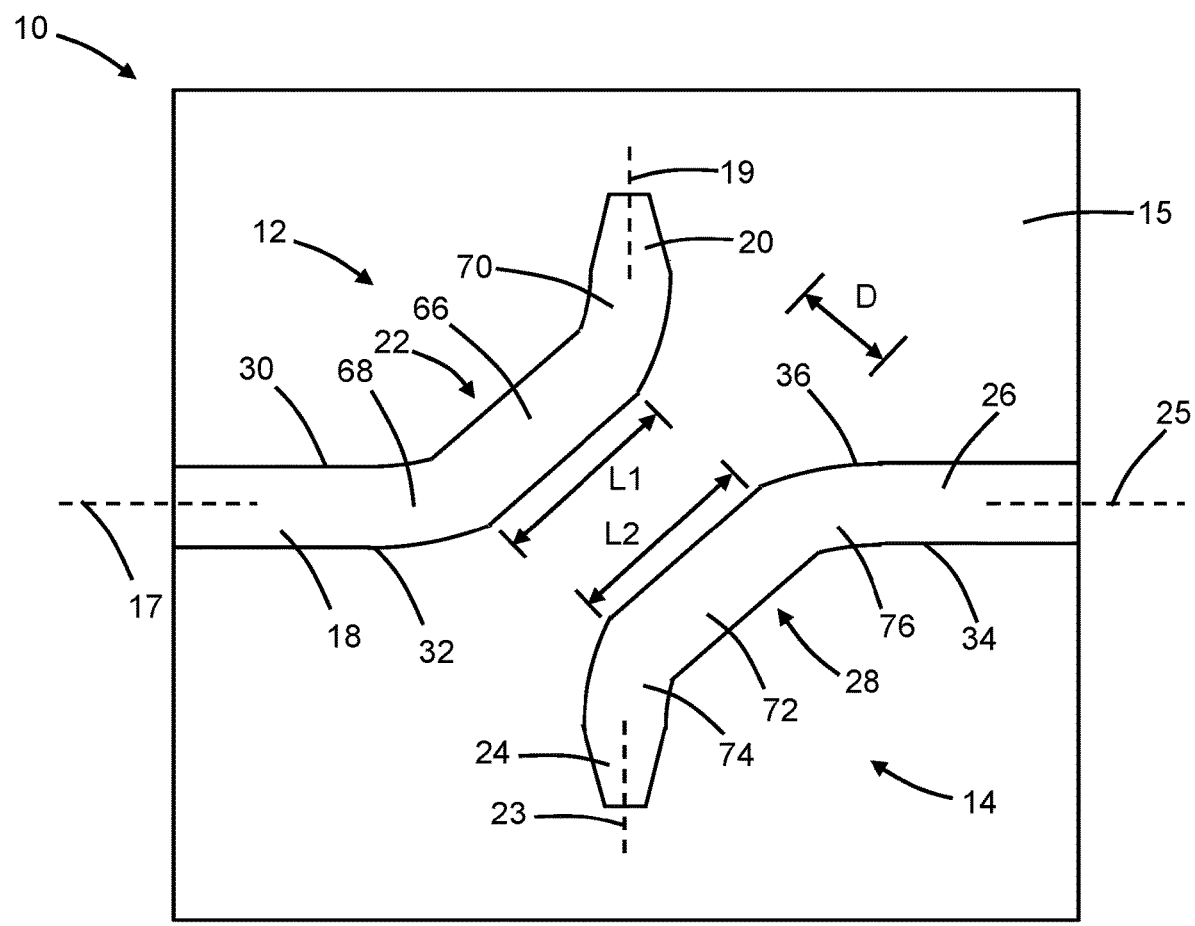
FIG. 8 is a top view of a structure in accordance with alternative embodiments of the invention.

With reference to FIG. 8 and in accordance with alternative embodiments, the waveguide bend 22 may be modified to add a section 66 that is non-curved and that interrupts its continuous curvature. The waveguide bend 22 may include a curved section 68 connecting the section 66 with the section 18 of the waveguide core 12 and a curved section 70 connecting the section 66 with the section 20 of the waveguide core 12. The section 66 connects the curved sections 68, 70 and is arranged along the length of the waveguide bend 22 between the curved section 68 and the curved section 70. The curved sections 68, 70 collectively provide the change in direction between the section 18 and the section 20 of the waveguide core 12.

The waveguide bend 28 may also be modified to add a section 72 that is non-curved and that interrupts its continuous curvature. The waveguide bend 28 may include a curved section 74 connecting the section 72 with the section 24 of the waveguide core 14 and a curved section 76 connecting the section 66 with the section 26 of the waveguide core 14. The section 72 connects the curved sections 74, 76 and is arranged along the length of the waveguide bend 28 between the curved section 74 and the curved section 76. The curved sections 74, 76 collectively provide the change in direction between the section 24 and the section 26 of the waveguide core 14.

In an embodiment, the section 66 of the waveguide bend 22 and the section 72 of the waveguide bend 28 may be straight or substantially straight, and the sections 66, 72 may be separated by the gap distance D. The section 66 of the waveguide bend 22 may have a length L1, and the section 72 of the waveguide bend 28 may have a length L2. In an embodiment, the lengths of the sections 66 and 72 may be substantially equal. In an embodiment, the length L1 of the section 66 and the length L2 of the section 72 may be unequal, which may introduce a phase delay proportional to the length difference. The ratio of the length L1 of the section 66 and the length L2 of the section 72 may determine the split ratio.

In an embodiment, the waveguide bend 22 including the non-curved section 66 and/or the waveguide bend 28 including the non-curved section 72 may be segmented as described in connection with FIGS. 6 and 7. In an alternative embodiment, only one or both of the sections 66, 72 may be segmented.

Figure 9:
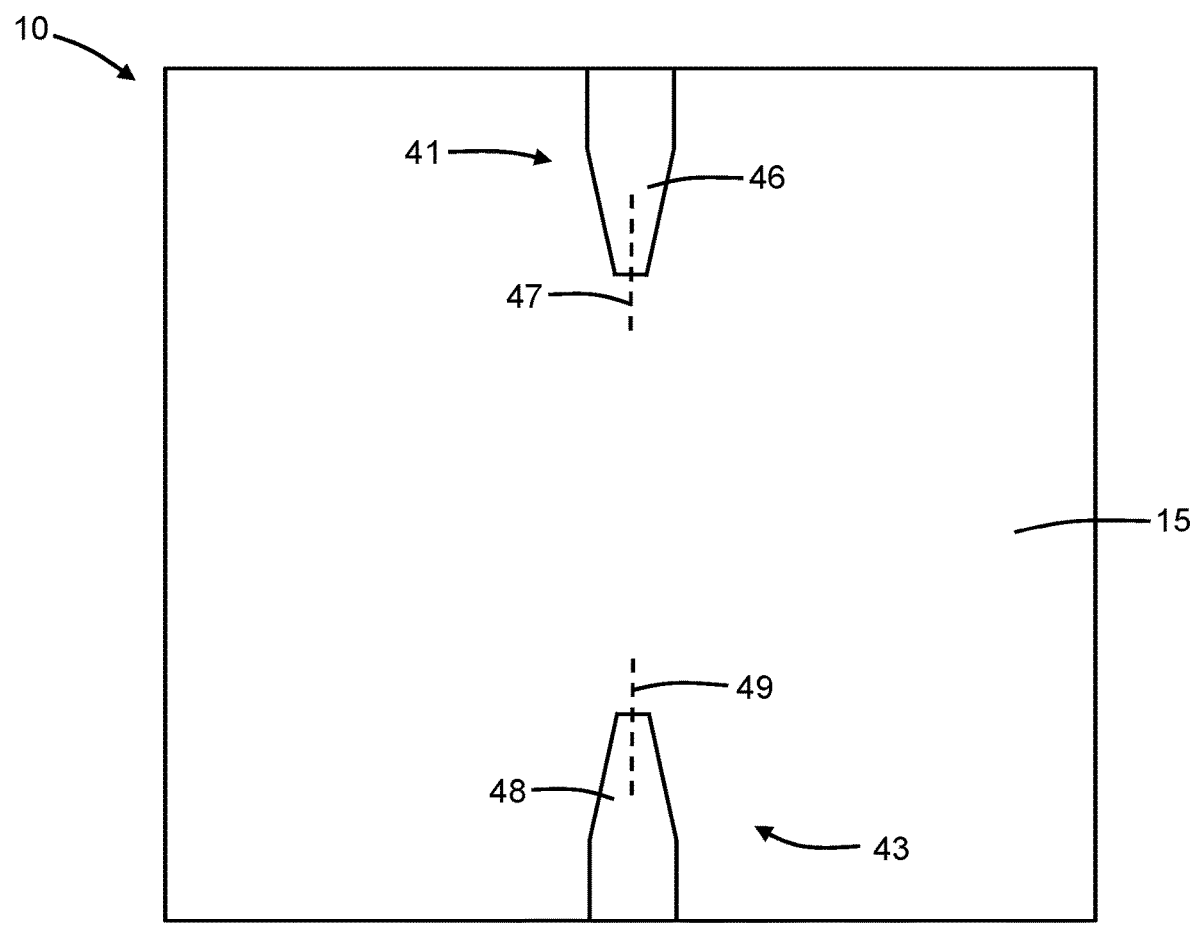
FIGS. 9 and 10 are top views of a structure in accordance with alternative embodiments of the invention.
Figure 10:
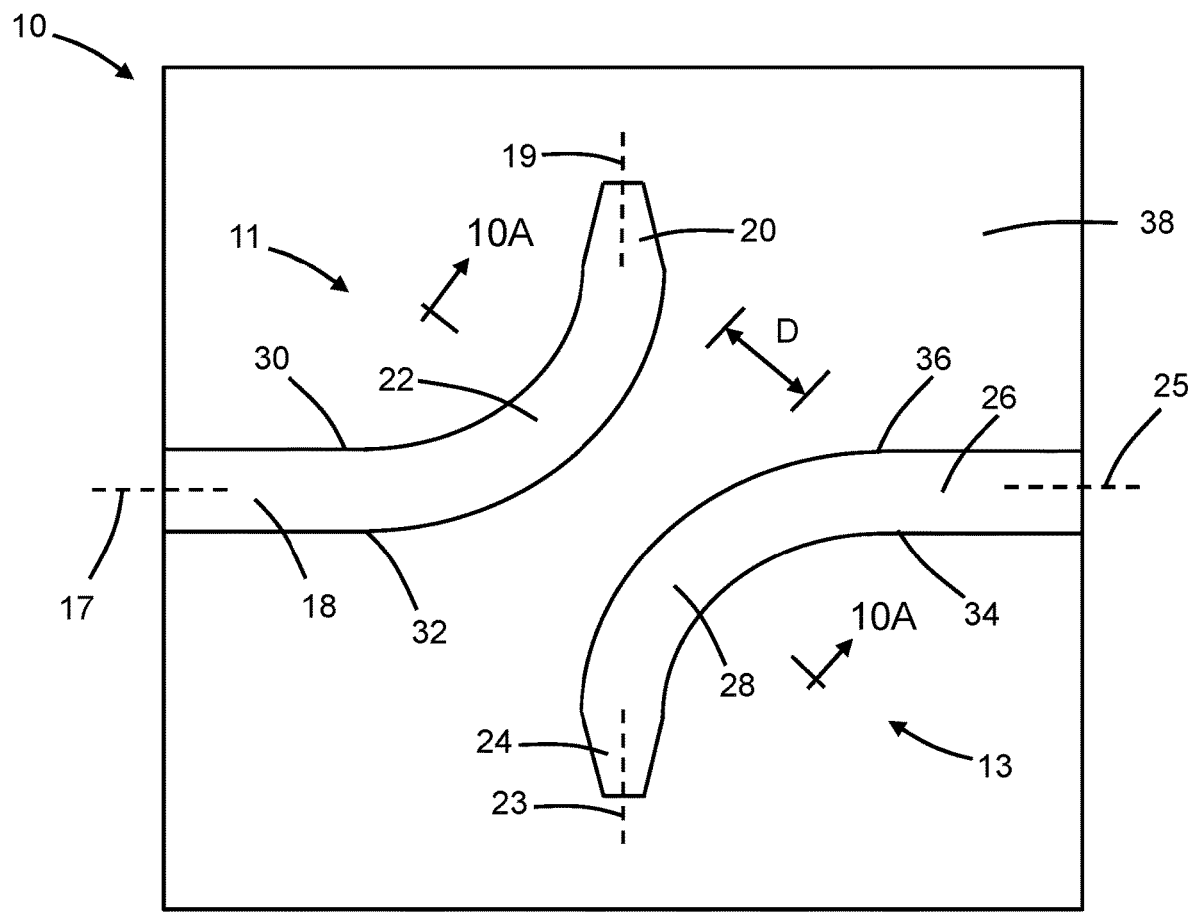
Figure 10A:
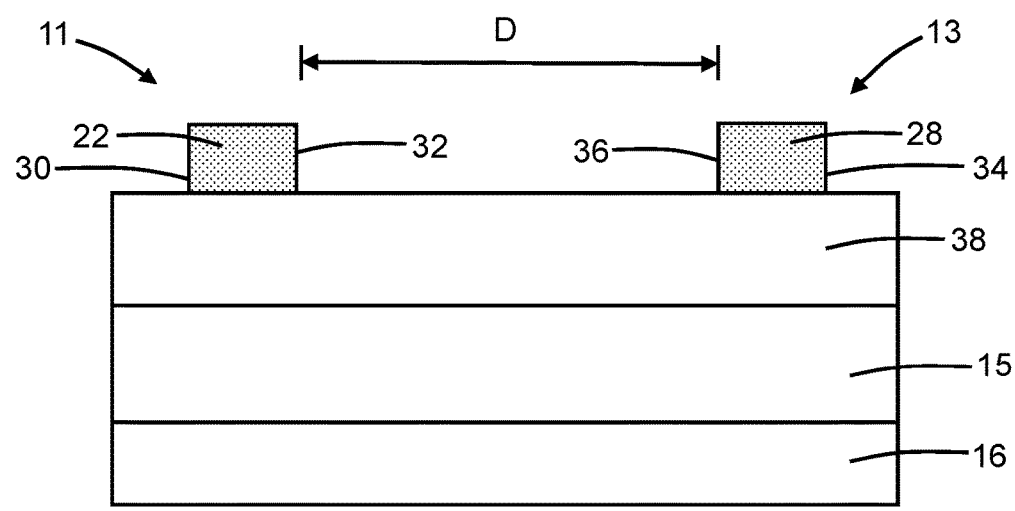
FIG. 10A is a cross-sectional view taken generally along line 10A-10A in FIG. 10.

With reference to FIGS. 9, 10, 10A and in accordance with alternative embodiments, the stacking of the waveguide cores 12, 14 and the waveguide cores 42, 44 may be inverted. In that regard, waveguide cores 41, 43 similar to the waveguide cores 42, 44 may be formed on the dielectric layer 15, and waveguide cores 11, 13 similar to the waveguide cores 12, 14 may be formed on the dielectric layer 38. In an alternative embodiment, the waveguide bend 22 of the waveguide core 11 and/or the waveguide bend 28 of the waveguide core 13 may be divided to incorporate segments similar to the segments 62, 64.

Figure 11:
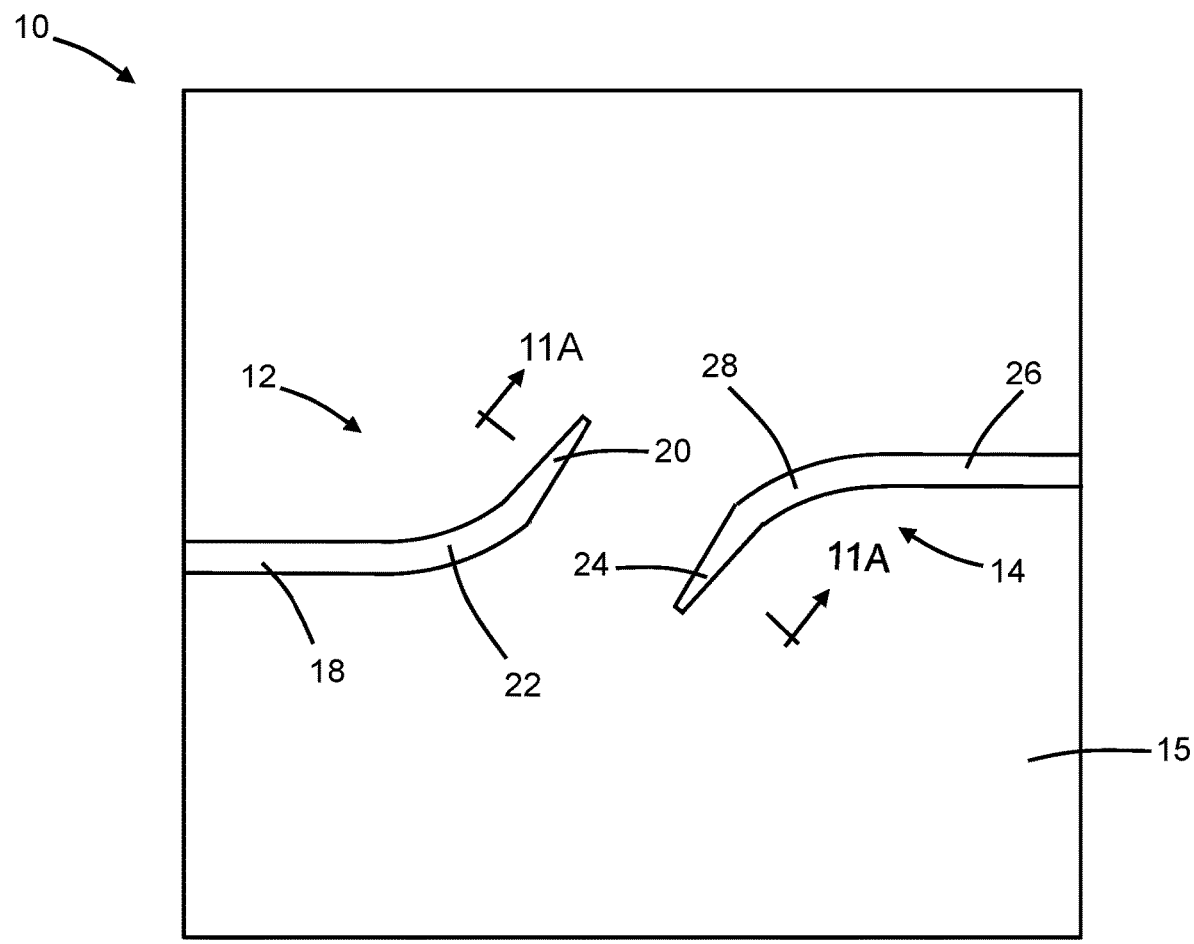
FIG. 11 is a top view of a structure in accordance with alternative embodiments of the invention.
Figure 11A:
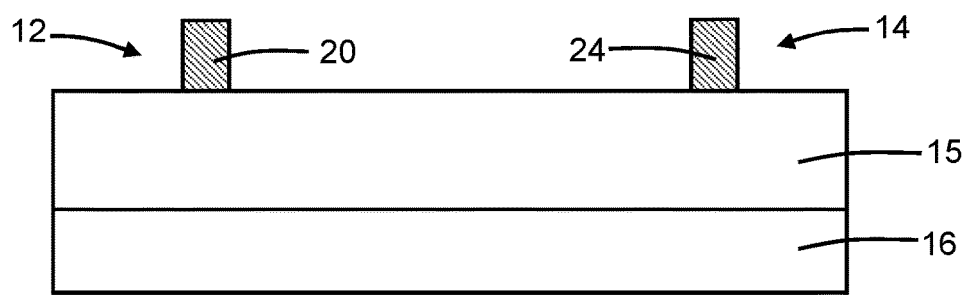
FIG. 11A is a cross-sectional view taken generally along line 11A-11A in FIG. 11.

With reference to FIG. 11, 11A and in accordance with alternative embodiments, the overlap between the waveguide cores 12, 14 and the waveguide cores 42, 44 may be modified. In that regard, the waveguide cores 12, 14 may be formed with shortened waveguide bends 22, 28 and lengthened sections 20, 24 that are tapered.

Figure 12:
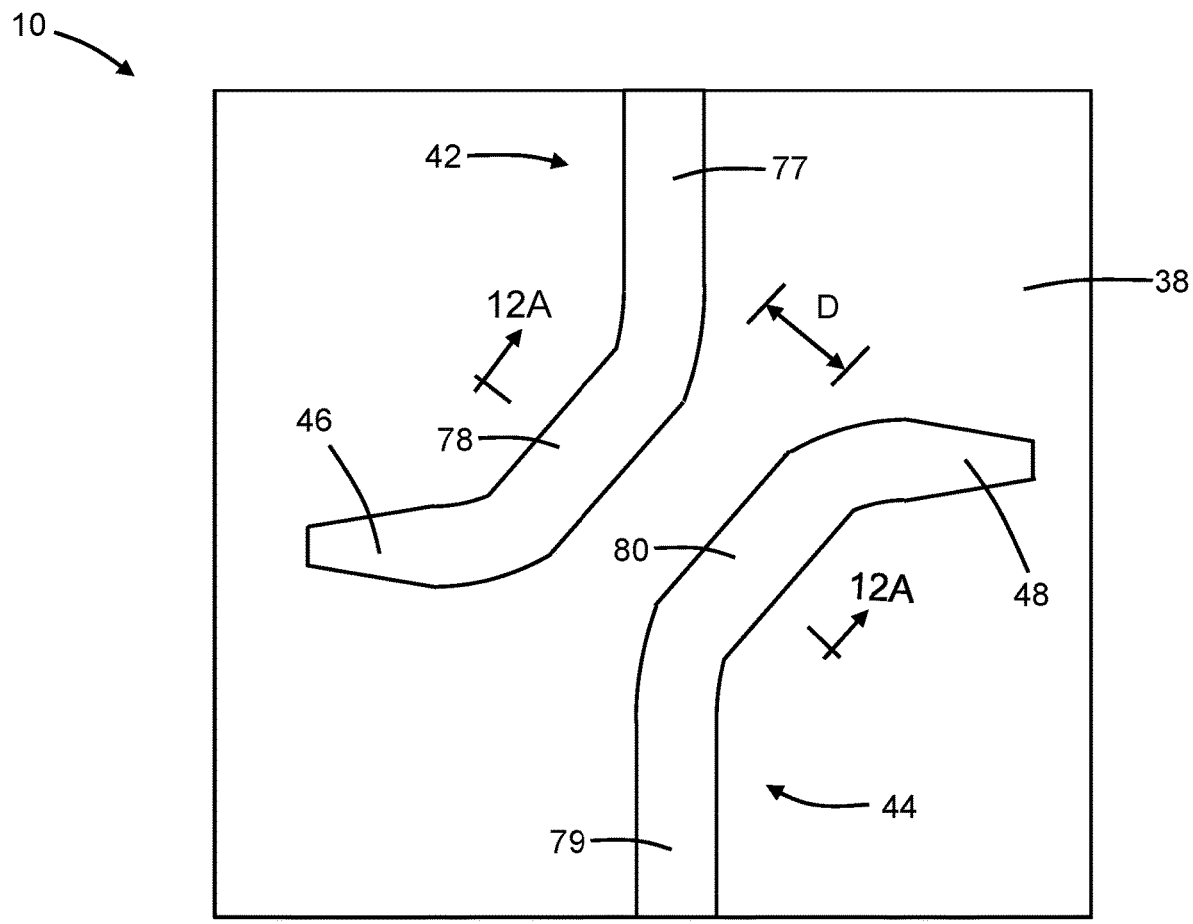
FIG. 12 is a top view of the structure at a fabrication stage of the processing method subsequent to FIG. 11.
Figure 12A:
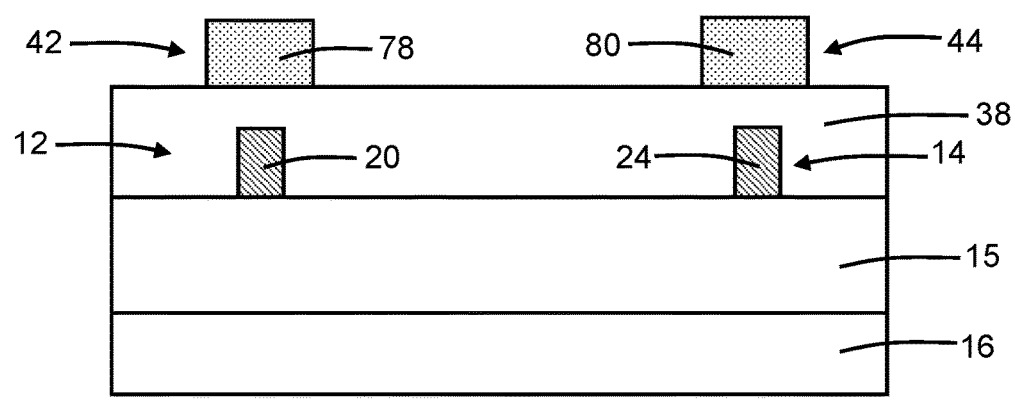
FIG. 12A is a cross-sectional view taken generally along line 12A-12A in FIG. 12.

With reference to FIGS. 12, 12A in which like reference numerals refer to like features in FIGS. 11, 11A and at a subsequent fabrication stage, the waveguide cores 42, 44 may be formed over the waveguide cores 12, 14. The waveguide core 42 may be modified to include a waveguide bend 78 that connects a section 77 with the terminating section 46, and the waveguide core 44 may be modified to include a waveguide bend 80 that connects a section 79 with the terminating section 48. The waveguide bend 78 is positioned in an overlapping arrangement with the section 20, and the waveguide bend 80 is positioned in an overlapping arrangement with the section 24.

Light may be transferred in one arm of the waveguide crossing between the waveguide cores 12, 14 by optical coupling between the waveguide bend 78 of the waveguide core 42 and the overlapped section 20 of the waveguide core 12 and the waveguide bend 80 of the waveguide core 44 and the overlapped section 24 of the waveguide core 14. Light may be also transferred in the other arm of the waveguide crossing between the waveguide cores 42, 44 by optical coupling between the waveguide bend 78 of the waveguide core 42 and the overlapped section 20 of the waveguide core 12 and the waveguide bend 80 of the waveguide core 44 and the overlapped section 24 of the waveguide core 14.

In an alternative embodiment, the stacking of the waveguide cores 12, 14 and the waveguide cores 42, 44 may be inverted. In an alternative embodiment, the waveguide bend 78 of the waveguide core 42 and the overlapped section 20 of the waveguide core 12 may be divided to include segments similar to the segments 62, 64, and the waveguide bend 80 of the waveguide core 44 and the overlapped section 24 of the waveguide core 14 may be divided to include segments similar to the segments 62, 64.

Figure 13:
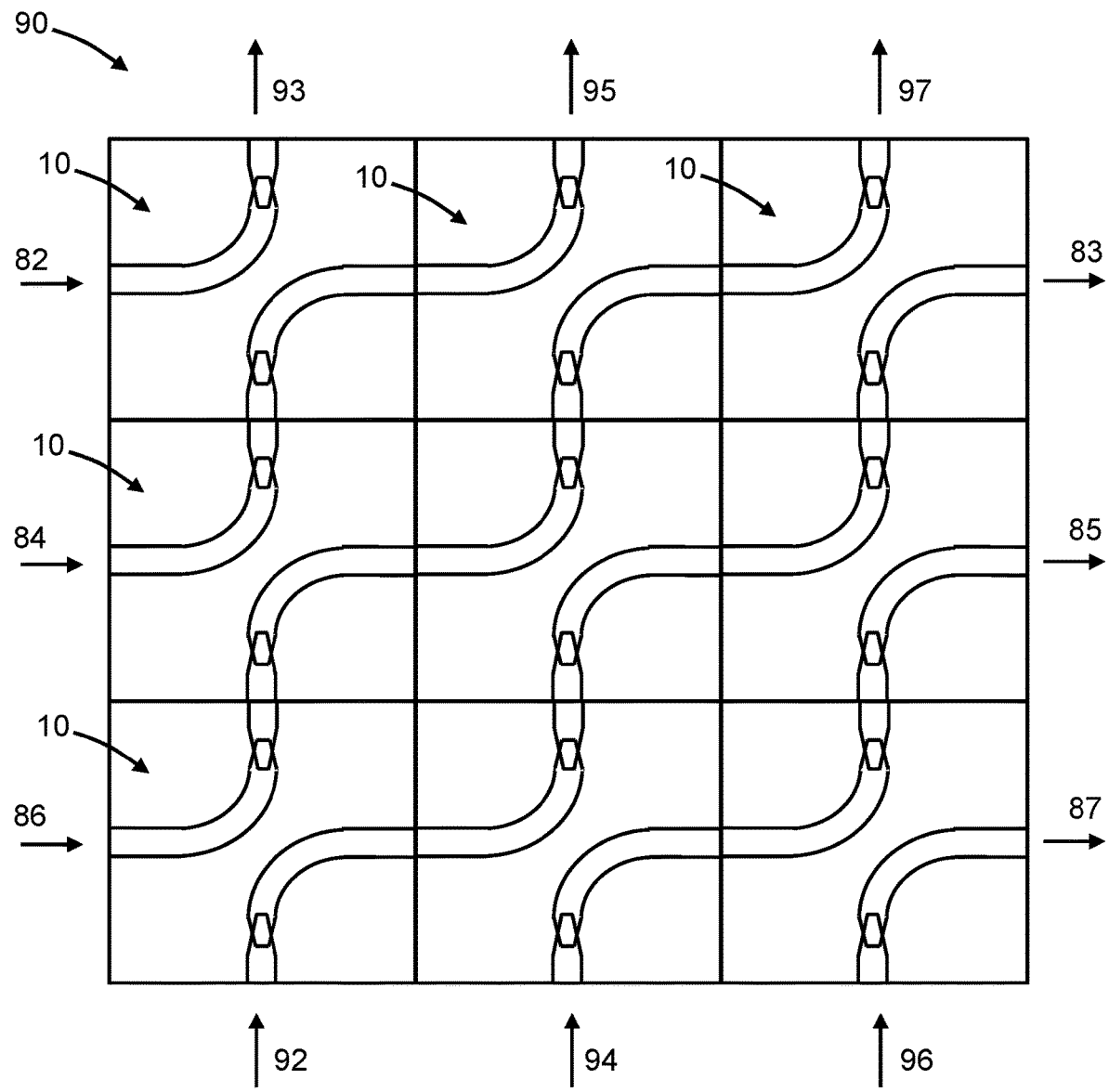
FIG. 13 is a diagrammatic top view of a structure in accordance with alternative embodiments of the invention.

With reference to FIG. 13 and in accordance with alternative embodiments, the structure 10 of any of the embodiments may be replicated and arranged to form elements in an n-by-n array 90 of substantially-identical waveguide crossings in a photonic integrated circuit. In the various embodiments disclosed herein, the structure 10 may enable the construction of a high-density and large-scale n-by-n array 90 of waveguide crossings.

For example, light at inputs 82, 84, 86 can be transmitted in paths across the n-by-n array 90 in one direction in a plane (e.g., an x-direction in an x-y cartesian plane) to outputs 83, 85, 87, and light at inputs 92, 94, 96 can be transmitted in paths across the n-by-n array 90 in an orthogonal direction in the plane (e.g., a y-direction in an x-y cartesian plane) to the paths for the outputs 93, 95, 97. In an embodiment, the splitting ratios of the structures 10 may be adjusted such that the light intensities at the inputs 82, 84, 86 differ from the light intensities at the outputs 83, 85, 87, and/or the light intensities at the inputs 92, 94, 96 differ from the light intensities at the outputs 93, 95, 97.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a waveguide crossing, the structure comprising:
   a first waveguide core including a first section, a second section, and a first waveguide bend connecting the first section to the second section, the second section terminating the first waveguide core, and the first waveguide core having a first side surface extending about the first waveguide bend;
   a second waveguide core including a first section, a second section, and a second waveguide bend connecting the first section to the second section, the second section terminating the second waveguide core, the second waveguide core having a second side surface extending about the second waveguide bend, and the second waveguide bend spaced from the first waveguide bend by a gap between the second side surface and the first side surface;
   a third waveguide core including a section terminating the third waveguide core, the section of the third waveguide core positioned in a vertical direction relative to the second section of the first waveguide core, and the section of the third waveguide core and the second section of the first waveguide core having a first overlapping arrangement; and
   a fourth waveguide core including a section terminating the fourth waveguide core, the section of the fourth waveguide core positioned in the vertical direction relative to the second section of the second waveguide core, and the section of the fourth waveguide core and the second section of the second waveguide core having a second overlapping arrangement,
   wherein the vertical direction is perpendicular to a horizontal direction, the first section of the first waveguide core is aligned along a first longitudinal axis, parallel to the horizontal direction the first section of the second waveguide core is aligned along a second longitudinal axis, parallel to the horizontal direction and the first longitudinal axis is substantially collinear with the second longitudinal axis.

2. The structure of claim 1 wherein the first waveguide bend includes a first plurality of segments arranged in a first curved arc.

3. The structure of claim 2 wherein the second waveguide bend includes a second plurality of segments arranged in a second curved arc.

4. The structure of claim 3 wherein the first plurality of segments and the second plurality of segments are separated by gaps, and the gaps are filled by a dielectric material.

5. The structure of claim 3 wherein the first plurality of segments comprise a first subwavelength grating, and the second plurality of segments comprise a second subwavelength grating.

6. The structure of claim 1 wherein the waveguide crossing is an element included in an array of waveguide crossings.

7. The structure of claim 1 wherein the section of the third waveguide core is aligned along a third longitudinal axis, the section of the fourth waveguide core is aligned along a fourth longitudinal axis, and the third longitudinal axis is substantially collinear with the fourth longitudinal axis.

8. The structure of claim 7 wherein the first longitudinal axis is angled at a first angle relative to the third longitudinal axis, and the second longitudinal axis is angled at a second angle relative to the fourth longitudinal axis.

9. The structure of claim 7 wherein the first longitudinal axis is aligned transverse to the third longitudinal axis, and the second longitudinal axis is aligned transverse to the fourth longitudinal axis.

10. The structure of claim 1 wherein the gap between the second side surface and the first side surface is filled by a dielectric material.

11. The structure of claim 1 wherein the first waveguide core and the second waveguide core comprise a first material, and the third waveguide core and the fourth waveguide core comprise a second material different from the first material.

12. The structure of claim 1 further comprising:
a substrate;
a first dielectric layer over the first waveguide core and the second waveguide core; and
a second dielectric layer over the third waveguide core and the fourth waveguide core,
wherein the first waveguide core is positioned in the vertical direction between the third waveguide core and the substrate, and the second waveguide core is positioned in the vertical direction between the fourth waveguide core and the substrate.

13. The structure of claim 1 further comprising:
a substrate;
a first dielectric layer over the first waveguide core and the second waveguide core; and
a second dielectric layer over the third waveguide core and the fourth waveguide core,
wherein the third waveguide core is positioned in the vertical direction between the first waveguide core and the substrate, and the fourth waveguide core is positioned in the vertical direction between the second waveguide core and the substrate.

14. A structure for a waveguide crossing, the structure comprising:
a first waveguide core including a first section, a second section, and a first waveguide bend connecting the first section to the second section, the second section terminating the first waveguide core, and the first waveguide core having a first side surface extending about the first waveguide bend;
a second waveguide core including a first section, a second section, and a second waveguide bend connecting the first section to the second section, the second section terminating the second waveguide core, the second waveguide core having a second side surface extending about the second waveguide bend, and the second waveguide bend spaced from the first waveguide bend by a gap between the second side surface and the first side surface;
a third waveguide core including a section terminating the third waveguide core, the section of the third waveguide core positioned in a vertical direction relative to the second section of the first waveguide core, and the section of the third waveguide core and the second section of the first waveguide core having a first overlapping arrangement; and
a fourth waveguide core including a section terminating the fourth waveguide core, the section of the fourth waveguide core positioned in the vertical direction relative to the second section of the second waveguide core, and the section of the fourth waveguide core and the second section of the second waveguide core having a second overlapping arrangement,
wherein the vertical direction is perpendicular to a horizontal direction, the first section of the first waveguide core is aligned along a first longitudinal axis parallel to the horizontal direction, the first section of the second waveguide core is aligned along a second longitudinal axis parallel to the horizontal direction, the first longitudinal axis is substantially collinear with the second longitudinal axis, the first waveguide bend of the first waveguide core includes a first curved section, a second curved section, and a first non-curved section connecting the first curved section with the second curved section, and the first waveguide bend of the second waveguide core includes a first curved section, a second curved section, and a second non-curved section connecting the first curved section with the second curved section.

15. The structure of claim 14 wherein the first non-curved section and the second non-curved section are substantially straight, and the first non-curved section and the second non-curved section are separated by the gap between the second side surface and the first side surface.

16. The structure of claim 14 wherein the first waveguide bend includes a first plurality of segments arranged in a first curved arc.

17. The structure of claim 16 wherein the second waveguide bend includes a second plurality of segments arranged in a second curved arc.

18. The structure of claim 14 further comprising:
a substrate;
a first dielectric layer over the first waveguide core and the second waveguide core; and
a second dielectric layer over the third waveguide core and the fourth waveguide core,
wherein the first waveguide core is positioned in the vertical direction between the third waveguide core and the substrate, and the second waveguide core is positioned in the vertical direction between the fourth waveguide core and the substrate.

19. The structure of claim 14 further comprising:
a substrate;
a first dielectric layer over the first waveguide core and the second waveguide core; and
a second dielectric layer over the third waveguide core and the fourth waveguide core,
wherein the third waveguide core is positioned in the vertical direction between the first waveguide core and the substrate, and the fourth waveguide core is positioned in the vertical direction between the second waveguide core and the substrate.

20. A method of forming a structure for a waveguide crossing, the method comprising:
forming a first waveguide core including a first section, a second section, and a first waveguide bend connecting the first section to the second section, wherein the second section terminates the first waveguide core, the first section of the first waveguide core is aligned along a first longitudinal axis parallel to a horizontal direction, and the first waveguide core has a first side surface extending about the first waveguide bend;
forming a second waveguide core including a first section, a second section, and a second waveguide bend connecting the first section to the second section, wherein the second section terminates the second waveguide core, the first section of the second waveguide core is aligned along a second longitudinal axis parallel to the horizontal direction, the second waveguide core has a second side surface extending about the second waveguide bend, the first longitudinal axis is substantially collinear with the second longitudinal axis, and the second waveguide bend is spaced from the first waveguide bend by a gap between the second side surface and the first side surface;

forming a third waveguide core including a section terminating the third waveguide core, wherein the section of the third waveguide core is positioned in a vertical direction relative to the second section of the first waveguide core, the vertical direction is perpendicular to the horizontal direction, and the section of the third waveguide core and the second section of the first waveguide core have a first overlapping arrangement; and forming a fourth waveguide core including a section terminating the fourth waveguide core, wherein the section of the fourth waveguide core is positioned in the vertical direction relative to the second section of the second waveguide core, and the section of the fourth waveguide core and the second section of the second waveguide core have a second overlapping arrangement.

* * * * *